US008457086B2

(12) United States Patent
Asati et al.

(10) Patent No.: US 8,457,086 B2
(45) Date of Patent: Jun. 4, 2013

(54) DYNAMIC EQAM DISCOVERY IN M-CMTS ARCHITECTURE

(75) Inventors: Rajiv Asati, Research Triangle Park, NC (US); John Chapman, San Jose, CA (US); Mohamed Khalid, Research Triangle Park, NC (US)

(73) Assignee: Cisco Technology, Inc., San Jose, CA (US)

( * ) Notice: Subject to any disclaimer, the term of this patent is extended or adjusted under 35 U.S.C. 154(b) by 1218 days.

(21) Appl. No.: 12/326,599

(22) Filed: Dec. 2, 2008

(65) Prior Publication Data

US 2010/0135265 A1    Jun. 3, 2010

(51) Int. Cl.
*H04W 4/00*      (2009.01)
*G01R 31/08*    (2006.01)
*H04J 1/16*       (2006.01)
*H04L 12/28*    (2006.01)
*H04L 12/16*    (2006.01)
*H04B 1/00*      (2006.01)
*H04N 7/173*    (2011.01)

(52) U.S. Cl.
USPC ........... 370/338; 370/216; 370/217; 370/248; 370/256; 370/461; 375/149; 725/109

(58) Field of Classification Search
USPC .. 370/217, 256, 248, 216, 461, 338; 375/149; 725/109
See application file for complete search history.

(56) References Cited

U.S. PATENT DOCUMENTS

| 8,090,007 | B1* | 1/2012 | Mitchell | 375/149 |
|---|---|---|---|---|
| 2002/0108120 | A1* | 8/2002 | Bahraini et al. | 725/109 |
| 2003/0147352 | A1* | 8/2003 | Ishibashi et al. | 370/248 |
| 2005/0265376 | A1* | 12/2005 | Chapman et al. | 370/461 |
| 2006/0140111 | A1* | 6/2006 | Vasseur et al. | 370/216 |
| 2009/0252065 | A1* | 10/2009 | Zhang et al. | 370/256 |
| 2009/0310480 | A1* | 12/2009 | Bao et al. | 370/217 |

OTHER PUBLICATIONS

Coltun, R., "RFC2370—The OSPF Opaque LSA Option", (http://www.faqs.org/rfcs/rfc2370.html), Jul. 1998.

* cited by examiner

*Primary Examiner* — Ian N Moore
*Assistant Examiner* — Kiet Tang
(74) *Attorney, Agent, or Firm* — Leon R. Turkevich

(57) ABSTRACT

In one example, an Edge Quadrature Amplitude Modulation (EQAM) communicates EQAM information to a Modular Cable Modem Termination System (M-CMTS) core using a routing protocol that is configured on a packet switched network coupling the EQAM to the M-CMTS core. The EQAM generates a routing message according to the routing protocol and inserts EQAM information, such as a description of a modulated channel extending from the EQAM, the service-group information, etc, into the routing message. The EQAM then floods the EQAM information over at least portions of a routing domain by transmitting the routing message to an adjacent intermediary device.

12 Claims, 4 Drawing Sheets

DYNAMIC EQAM DISCOVERY IN M-CMTS ARCHITECTURE

TECHNICAL FIELD

The present disclosure relates generally to the field of networking.

BACKGROUND

Cable operators have widely deployed high-speed data services on cable television systems. These data services allow subscriber-side devices, such as personal computers, to communicate over an ordinary cable TV network Hybrid Fiber Coax (HFC) cable through a cable modem. The cable modem communicates with a Cable Modem Termination System (CMTS), which connects the cable TV network to a data network, such as the Internet.

Modular CMTSs (M-CMTSs) have been developed to improve scaling and for other reasons. These modular systems typically include an M-CMTS core device implementing a subset of DOCSIS protocols (such as Media Access Control (MAC) layer, etc.) and one or more remote PHYs such as an Edge Quadrature Amplitude Modulation (EQAM) implementing the remaining DOCSIS protocols (such as the PHYsical layer (PHY), etc.) These EQAMs generally include modulation devices for modulating downstream traffic to the cable modems or demodulation devices for demodulating upstream traffic from the cable modems. The M-CMTS core and the EQAMs may use a Downstream External Physical Interface (DEPI) and Upstream External Physical Interface (UEPI) to transport downstream user data and upstream user data respectively.

These M-CMTS cores and EQAMs generally communicate with each other over tunnels extending over the DEPI. To establish these tunnels, the M-CMTS core needs to be aware of EQAM parameters, such as the EQAM IP address, prior to DEPI control plan setup. One partial solution is to initially provision the M-CMTS core with the EQAM IP address and other necessary EQAM parameters; however, with this partial solution, the M-CMTS core can lose the ability to set up new tunnels if there is a dynamic change to the EQAM IP address or other EQAM parameters. The disclosure that follows solves this and other problems.

DYNAMIC EQAM DISCOVERY IN M-CMTS ARCHITECTURE

Description of Example Embodiments

Overview

In one example, an Edge Quadrature Amplitude Modulation (EQAM) communicates EQAM information to a Modular Cable Modem Termination System (M-CMTS) core using a routing protocol that is configured on a packet switched network coupling the EQAM to the M-CMTS core. The EQAM generates a routing message according to the routing protocol and inserts EQAM information, such as a description of a modulated channel extending from the EQAM, the service-group information, etc., into the routing message. The EQAM then floods the EQAM information over at least portions of a routing domain by transmitting the routing message to an adjacent intermediary device. The M-CMTS core can accordingly dynamically discover information for each EQAM available in the network and use this information during Downstream External Physical Interface (DEPI) establishment.

Description

Several preferred examples of the present application will now be described with reference to the accompanying drawings. Various other examples of the invention are also possible and practical. This application may be exemplified in many different forms and should not be construed as being limited to the examples set forth herein.

Figure 1:
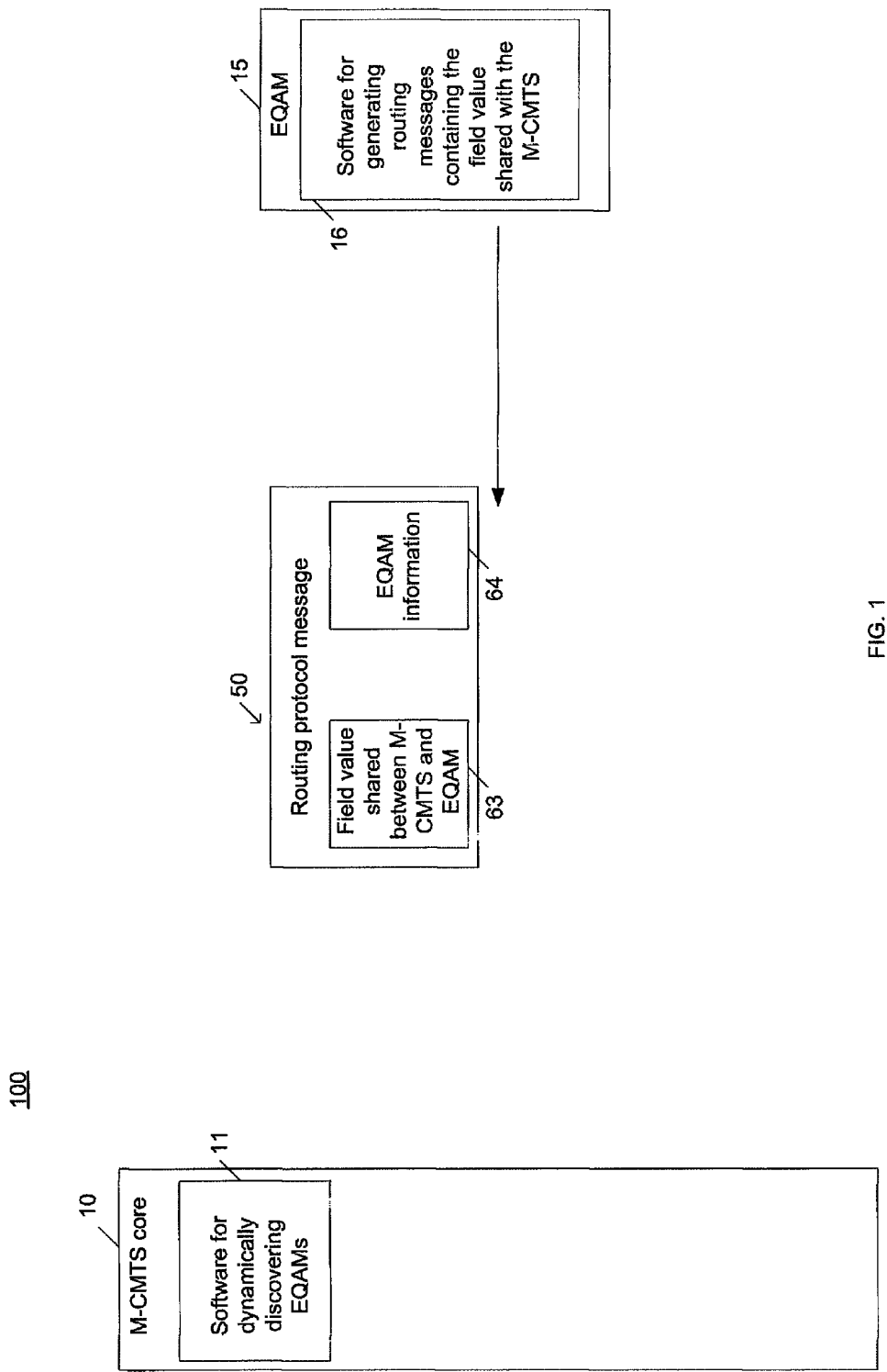
FIG. 1 illustrates dynamic Edge Quadrature Amplitude Modulation (EQAM) discovery in the Modular Cable Modem Termination System (M-CMTS) architecture.

FIG. 1 illustrates dynamic Edge Quadrature Amplitude Modulation (EQAM) discovery in the Modular Cable Modem Termination System (M-CMTS) architecture.

The example system 100 includes an M-CMTS core 10 and an EQAM 15 configured with software 11 and 16, respectively. The software 11 dynamically discovers EQAMs according to the routing message 50 generated using the software 16. As will be explained in great detail later with reference to FIG. 2, the system 100 expands an existing routing protocol already used in the network to send the routing message 50. In particular, referring still to FIG. 1, the routing message 50 contains a field value 63 to indicate that the EQAM information 64 is contained therein and to distinguish the routing message 50 from other routing messages sent using the protocol.

This dynamic discovery allows the M-CMTS core 10 to establish tunnels for routing traffic to EQAM channels independently of whether the M-CMTS core 10 is statically provisioned with address information and/or channel descriptions for the EQAM 15. Accordingly, the system 100 reduces administrative burden as the M-CMTS core 10 can discover the EQAM 15 automatically without relying on provisioning by a user.

This dynamic discovery also allows the M-CMTS core 10 to recover communication with the EQAM 15 (including establishing new tunnels) even in the event that the EQAM 15 changes its IP address, or other EQAM parameters, and regardless of whether the EQAM 15 has pre-negotiated the EQAM parameter change with the M-CMTS core 10. The EQAM 15 can send the routing messages 50 at regular intervals and/or after whenever there is a re-configuration on the EQAM 15 such that the M-CMTS core 10 regularly receives the EQAM information 64. Accordingly, the dynamic discovery can be automated so that the M-CMTS core 10 can re-establish communication with the EQAM 15 without a user inputting new data into the M-CMTS core 10 or the EQAM 15.

It should be apparent that the extension of the routing protocol for conveying the EQAM information 64 from the EQAM 15 to the M-CMTS core 10 allows the information exchange to occur in-band. Accordingly, unlike out-of-band signaling messages, the routing message 50 can be exchanged without relying on any other intermediate devices besides those already existing in the network for transferring content between the M-CMTS core 10 and EQAM 15. As a result, the routing message 50 can take various paths through the packet switched network such that its delivery is not reliant on a designated signaling manager or other single point of failure.

It should be apparent that the M-CMTS core 10, EQAM 15 and other nodes located in the packet switched network between the M-CMTS core 10 and the EQAM 15 are already configured with routing protocols as part of their existing functionality to ensure routing reachability for DEPI. The system 100 extends one of these routing protocols in a way that allows these intermediary nodes to participate in the EQAM information 64 exchange without being configured with any new protocols. Moreover, the system 100 allows these intermediary nodes to participate in the EQAM information exchange regardless of whether they understand the information contained in the routing message 50.

According to the above, it should be appreciated that the particular way in which the system 100 transfers the EQAM information 64 from the EQAM 15 to the M-CMTS core 10 allows the exchange to occur without requiring reconfiguration of any intermediary nodes located between the M-CMTS core 10 and the EQAM 15. The particular way in which the system 100 transfers the EQAM information 64 also does not require inclusion of any new devices into the packet switched network between the M-CMTS core 10 and the EQAM 15. Moreover, the particular way in which the system 100 transfers the EQAM information 64 is highly reliable and can continue to operate as long as there is in-band connectivity between the M-CMTS core 10 and the EQAM 15.

Figure 2:
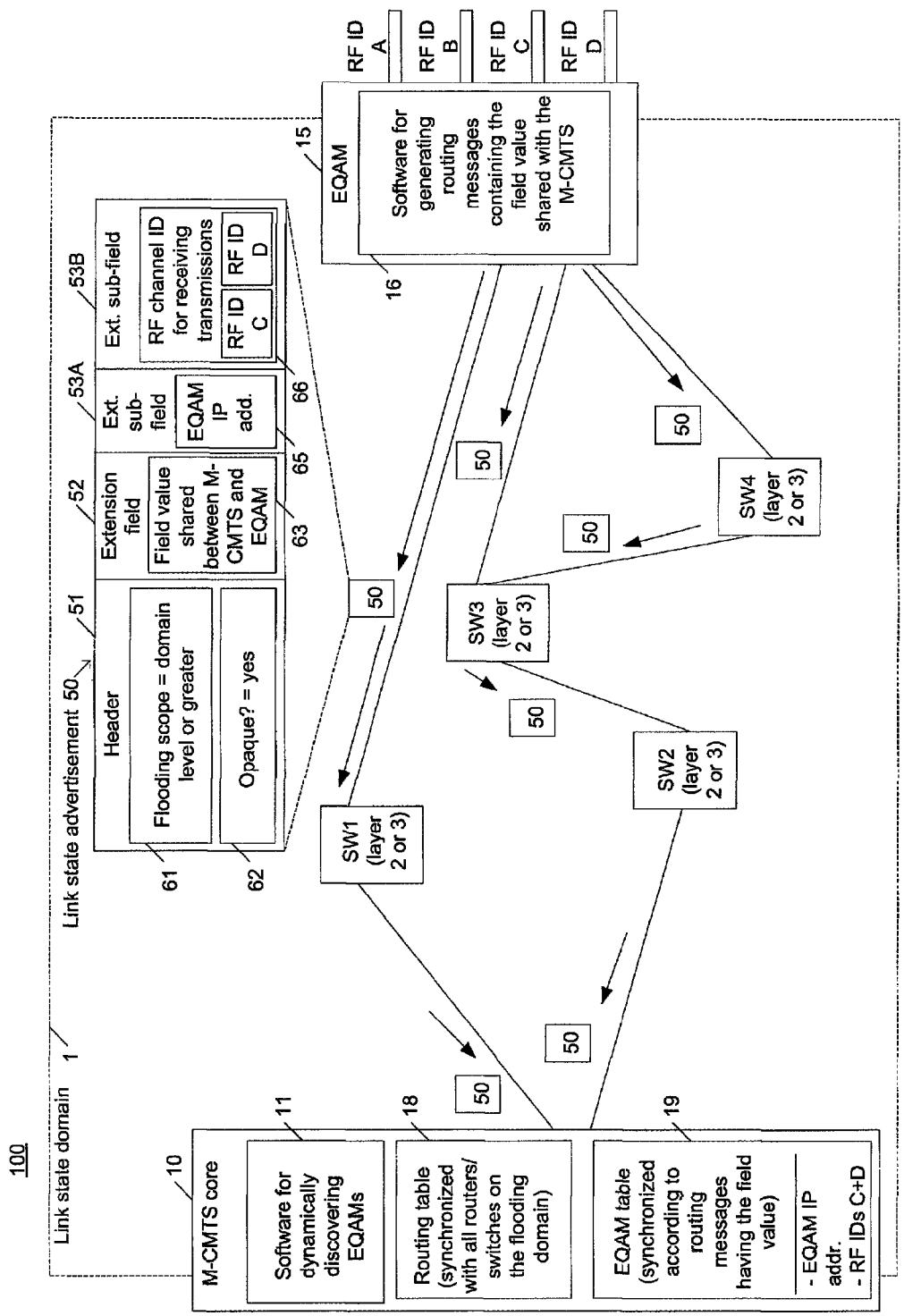
FIG. 2 illustrates one example of how the M-CMTS core shown in FIG. 1 dynamically discovers the EQAM.

FIG. 2 illustrates one example of how the M-CMTS core shown in FIG. 1 dynamically discovers the EQAM.

In the example described below with reference to FIG. 2, the system 100 extends the Open Shortest Path First (OSPF) protocol to transfer EQAM information to the M-CMTS core 10. Specifically, in the example the routing message 50 is a Link State Advertisement (LSA) of a type configured for flooding over at least the link state domain 1. Although the present example is described with reference to the OSPF protocol, it is also both practical and possible to apply the principles described herein to any type of routing protocol.

By way of background, Inter Gateway Protocols (IGPs) operate under the basic principle that routers need to exchange routing information using routing messages so that each router has some awareness of the network topology. It is impractical for every router on the network to maintain information about every other node and link, and accordingly, in one class of IGPs, called link state routing protocols, the network is logically segmented into different flooding domains Within each flooding domain, the routers are synchronized with the same network topology and routing information by flooding the routing message to every router. However, the routers in the flooding domain are not synchronized with routers located in other flooding domains.

Another class of IGPs, referred to as distance vector routing protocols, also operate under the basic principle that routers need to exchange routing information using routing messages so that each router has some awareness of the network topology. However, these routing protocols do not synchronize all routers on a domain with the same network topology and routing information. For example, in distance vector routing protocols, a router conveys routing information only to directly connected neighbors.

Although protocols from either class of IGPs can be extended to transfer the EQAM information in-band from the EQAM 15 to the M-CMTS core 10, certain synergies can be realized by extending a link state routing protocol to transfer the EQAM information. At least some of these synergies will be noted when describing, with reference to FIG. 2, the extension of the OSPF protocol for dynamic EQAM discovery. These synergies can be realized using other link state routing protocols besides OSPF, such as the Intermediate System-to-Intermediate System (IS-IS) protocol.

Referring to FIG. 2, the software 16 generates a link state advertisement 50 having the header 51. Within the header 51, a flooding scope field 61 is set to at least the domain level, which will cause intermediary nodes to flood the link state advertisement at least within the link state domain 1. Under the M-CMTS architecture, an M-CMTS core and an EQAM are typically contained within the same link state domain, and in such a typical environment, this flooding scope will ensure that flooding message 50 reaches the M-CMTS core 10.

Under the OSPF protocol, intra domain flooding scope can be obtained by setting type 9, 10, or 11 in the flooding scope field. Type 9 LSAs, which are flooded through the local domain, can be used in the typical environment where both gateways are in the same link state domain. If more extensive flooding is required to ensure delivery to the M-CMTS core 10, a type 10 or type 11 LSA can be used. A type 10 LSA is flooded up to the borders of the local area, while a type 11 LSA is flooded throughout the autonomous system.

The software 16 also uses the field 62 to identify the link state advertisement 50 as an opaque type. This designation indicates that intermediary nodes are to propagate the link state advertisement independently of whether the node is configured to recognize the field value 63 contained in the extension field 52. Setting this field 62 allows the system 100 to be implemented without reconfiguring the intermediary nodes, e.g. without reconfiguring nodes SW1-SW4. In OSPF, this field 62 can be set to opaque type 4.

Referring now to the extension field 52, the software 16 formats a field value 63 that has is pre-shared between the M-CMTS core 10 and the EQAM 15. The presence of the field value 63 in the field 52 will cause the software 11 to distinguish the link state advertisement 50 from other link state advertisements, the advantages of which will be discussed in greater detail later. This field value 63 can be pre-shared in any manner, such as a user configuring both the M-CMTS core 10 and the EQAM 15 with the field value 63, by configuring the M-CMTS core 10 and the EQAM 15 with some other common information, or by the M-CMTS core 10 and the EQAM 15 using a message exchange to set the field value 63.

With respect to extension sub-fields, the software 16 attaches at least one sub-field after the extension field 52. The extension sub-field 53A, for example, is used to indicate the current EQAM IP address 65. The communication of the EQAM IP address 65 to the M-CMTS core 10 allows the M-CMTS core 10 to dynamically discover the EQAM 15, some of the benefits of which have been previously discussed with reference to FIG. 1.

Referring still to FIG. 2, the system 100 can optionally use other sub-fields for enabling additional capabilities besides dynamic discovery of the EQAM 15. For example, other sub-fields can be used to enable the EQAM 15 to exert control over how M-CMTS core 10 establishes the tunnels after having dynamically discovered the EQAM 15. One example of such optional additional sub-fields is sub-field 53B, which contains Radio Frequency (RF) channel information.

By way of background, the EQAM 15, being a gateway between the packet switched network and a modulated network, contains a plurality of modulated channels extending therefrom. In the present example, four of these modulated channels are illustrated; however, it should be apparent that any number of modulated channels can extend from the EQAM 15. The modulated channels are each assigned different identifiers, which are RF IDs A-D in the present example.

When the M-CMTS core 10 establishes tunnels to the EQAM 15, these tunnels will be established to particular ones of the modulated channels. Generally, the M-CMTS core 10 selects which one or ones of the modulated channels receive the tunnel traffic.

In contrast to other systems whereby the M-CMTS core 10 completely controls which RF channels the tunnels are extended thereto, in the system 100 such control can be distributed using the extension sub-fields of the link state advertisement 50. For example, the EQAM 15 can select which of the RF IDs A-D are revealed to the M-CMTS core 10. If the EQAM 15 includes all of the RF IDs A-D in the extension sub-field 53B, then tunnel traffic will be sent to any of the corresponding modulated channels according to remote selection by the M-CMTS core 10. However, if the EQAM 15 includes only a subset of the RF IDs A-D, such as only RF IDS C and D as illustrated, then tunnel traffic will be sent to only those corresponding modulated channels according to remote selection by the M-CMTS core 10. Accordingly, by revealing only a subset of the channel identifiers in the RF channel information 66, the EQAM 15 can retain some control over which of the modulated channels receive traffic from M-CMTS core 10.

The examples provided above of the type of information that can be inserted into the link state advertisement 50 are not exhaustive. Other examples of EQAM parameters that can be included in the advertisement 50 include QAM Service Group IDs. Exchanging this EQAM parameter allows the M-CMTS core 10 and the EQAM 15 to subsequently tunnel the traffic to the modulated channels revealed by the EQAM 15 according to the service group information.

After the link state advertisement 50 is generated, the software 16 addresses the advertisement 50 to be transmitted to an adjacent intermediary hop, such as nodes SW1, SW3, and/or SW4. Thereafter, the inter gateway routing protocol causes the link state advertisement 50 to be flooded according to the flooding scope indicated in the field 61, which causes the advertisement to be flooded over at least the local link state domain 1. Accordingly to such flooding, the advertisement 50 will reach the M-CMTS core 10 independently of whether the EQAM 15 is aware of the presence of the M-CMTS core 10, and independently of whether the M-CMTS core 10 is aware of the presence of the EQAM 15.

When the advertisement 50 is received at the M-CMTS core 10, the software 11 will distinguish the link state advertisement 50 from other advertisements according to the presence of the extension field 52 containing the field value 63. The M-CMTS core 10 contains a routing table 18 having the same information stored thereon as the other nodes in the link state domain 1. The M-CMTS core 10 also has an EQAM table 19 that contains information related to EQAM discovery. The M-CMTS core 10 updates one of the tables 18 and 19 according to whether the received advertisement 50 contains the extension field 52 with the field value 63. It should be apparent that a single link state advertisement 50 may contain many LSA types.

Once an entry for the EQAM 15 is added (or updated) to the EQAM table 19, the M-CMTS core 10 can establish tunnels to the EQAM 15 and route traffic thereto. The tunnels are established according to which RF IDs are stored in the table 19. These tunnels can be, for example, Label Switched Paths (LSP). The LSPs can be established according to the EQAM information using any procedure, such as by setting up a DEPI-MultiProtocol Label Switch (MPLS) Control Plane.

It should be apparent that it is both possible and practical to apply the principles described above to other router discover protocols besides OSPF. Any routing protocol that is capable of flooding information across at least portions of the packet switched network to the M-CMTS core 10 can be used for dynamic discovery on the cable network.

The principles described above can be used instead of out-of-band dynamic discovery techniques, or as a fallback for out-of-band signaling. For example, in an example system where an out-of-band signaling message is implemented as an initial mechanism for EQAM discovery, the M-CMTS core 10 can be configured to use the software 19 after some timeout or other condition indicates failure of out-of-band signaling. Such a system is highly robust as dynamic discovery is possible as long as there is either out-of-band signaling connectivity or in-band connectivity. Thus, the system 100 can be used as a fallback for the Edge Resource Management Interfaces (ERMI) protocol, for example.

Figure 3:
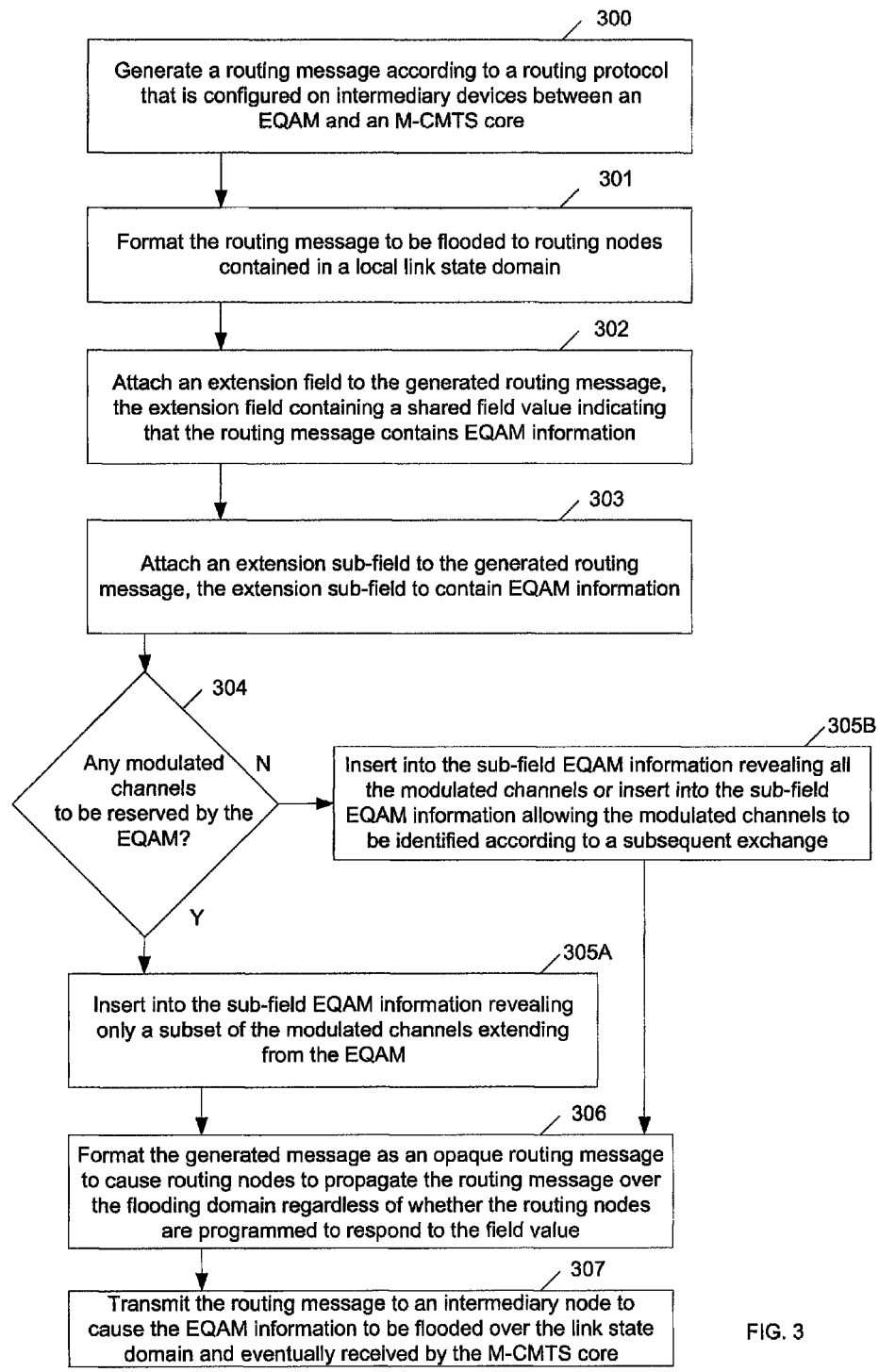
FIG. 3 illustrates how the EQAM shown in FIGS. 1 and 2 generates and sends routing messages containing the EQAM information.

FIG. 3 illustrates how the EQAM shown in FIGS. 1 and 2 generates and sends routing messages containing the EQAM information.

In block 300, the software 16 generates a routing message according to an routing protocol that is configured on intermediary devices between an EQAM and an M-CMTS core. In block 301, the software 16 formats the routing message to be flooded to routing nodes contained in a local link state domain. The software 16 attaches an extension field to the routing message in block 302, the extension field containing a field value indicating that the routing message contains EQAM information. The software 16 also attaches an extension sub-field to the generated routing message in block 303, the extension sub-field to contain the EQAM information.

If any modulated channels are to be reserved by the EQAM independently of M-CMTS core in diamond 304, then in block 305A the software 16 inserts into the sub-field EQAM information revealing only a subset of the modulated channels extending from the EQAM. Otherwise, in block 305B the software 16 inserts into the sub-field EQAM information revealing all the modulated channels or interests into the sub-field EQAM information allowing all the modulated channels to be identified according to a subsequent exchange.

In block 306, the software 16 formats the generated message as an opaque routing message to cause routing nodes to propagate the routing message over the flooding domain regardless of whether the routing nodes are programmed to respond to the field value. In block 307, the software 16 transmits the routing message to an intermediary node to cause the EQAM information to be flooded over at least portions of the link state domain and eventually received by the M-CMTS core.

Figure 4:
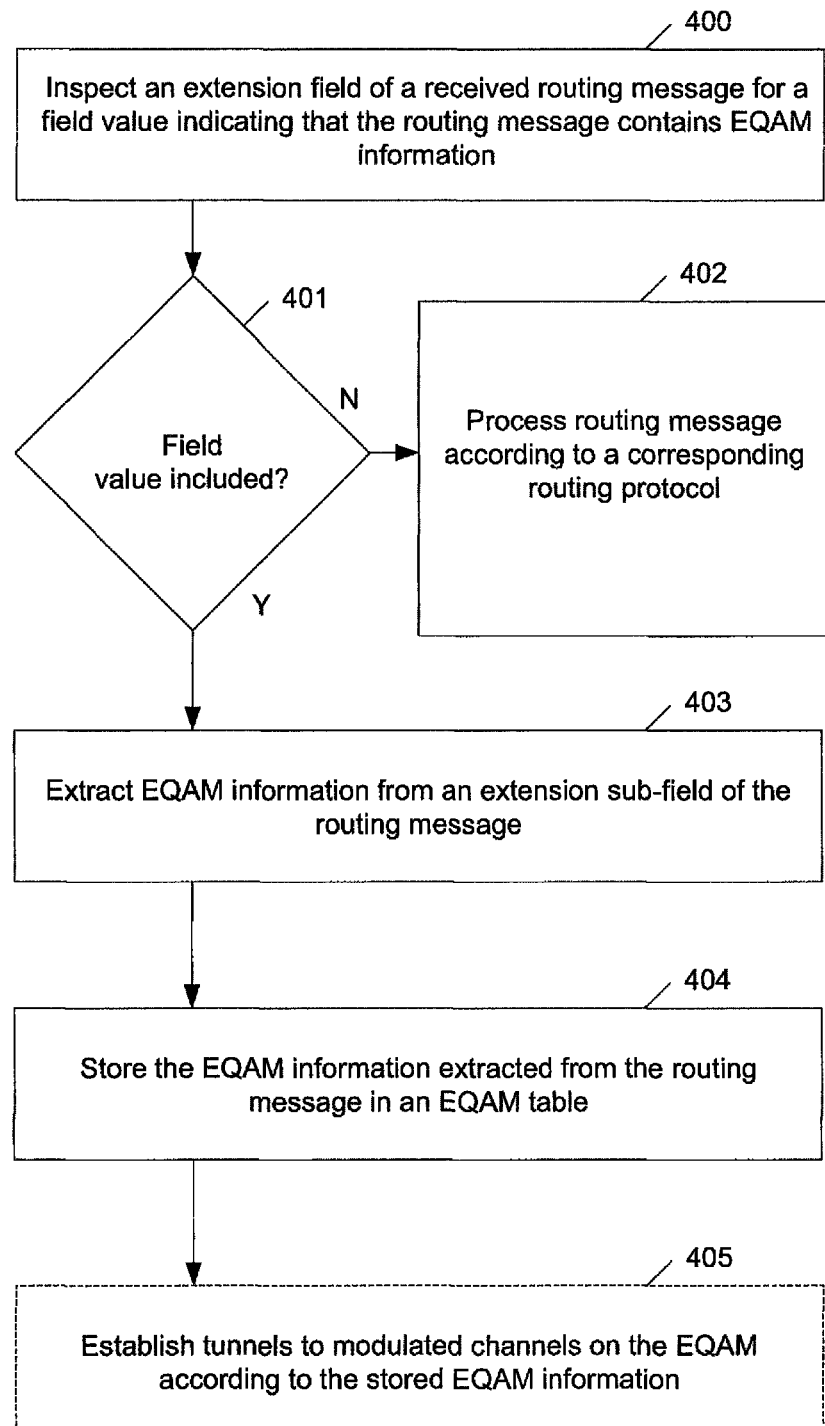
FIG. 4 illustrates how the M-CMTS core shown in FIGS. 1 and 2 dynamically discovers the EQAM.

FIG. 4 illustrates how the M-CMTS core shown in FIGS. 1 and 2 dynamically discovers the EQAM.

In block 400, the software 11 inspects an extension field of a received routing message for a field value indicating that the routing message contains EQAM information. If the routing message does not include the field value in diamond 401, then in block 402 the routing message is processed according to a corresponding routing protocol.

If the routing message does include the field value in diamond 401, then in block 403 the software 11 extracts EQAM information from an extension sub-field of the routing message. In block 404, the software 11 stores the EQAM information extracted from the routing message in an EQAM table for the M-CMTS core. In block 405, the M-CMTS core uses the stored EQAM information to establish tunnels on the EQAM. The block 405 is dashed to emphasize that this block is optional.

It should be understood that the principles described above are not limited to cable networks. For example, the principles described above can be applied to other networks where dynamic device discovery is useful.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A local gateway to exchange data between a modulated portion of a first cable network and a packet switched portion of the cable network, the local gateway comprising:
    circuitry configured to:
    generate a routing message according to a routing protocol that is configured on the packet switched network portion;
    configure the routing message to be flooded over a local link state domain that includes a remote gateway operating between the packet switched network portion and a second network;
    insert into the routing message a description of a modulated channel extending from the local gateway; and
    flood the modulated channel description over the local link state domain by transmitting the routing message to an adjacent intermediary device, wherein the routing message is not addressed to the remote gateway but the modulated channel description is delivered to the remote gateway according to the flooding;
    wherein the circuitry is further configured to:
    identify a plurality of RF channels extending from the local gateway;
    select a subset of the RF channels; and
    insert descriptions of only the selected subset of RF channels into the routing message such that the non-selected RF channels are not-revealed to the remote gateway, said insertion to partially control which RF channels receive tunnel traffic from the remote gateway.

2. The local gateway of claim 1, wherein selection of the RF channels for establishing tunnels thereto is distributed between the gateways, the local gateway initially selecting the subset of RF channels and the remote gateway subsequently controlling which RF channels from the subset receive the tunnel traffic.

3. The local gateway of claim 2, wherein the circuitry is further configured to:
    generate a new routing message;
    insert a different subset of RF channels descriptions into the newly generated routing message; and
    transmit the newly generated routing message to cause tunnel traffic to be re-distributed over the RF channels.

4. The local gateway of claim 1, wherein the circuitry is further configured to:
    generate a type 9, 10, or 11 Open Shortest Path First (OSPF) Link State Advertisement (LSA);
    attach an extension to the LSA, the extension containing a field value indicating that the LSA contains the modulated channel description.

5. A memory device having instructions stored thereon that, in response to execution by a processing device, cause the processing device to perform operations comprising:
    generating a routing message according to a routing protocol that is configured on a packet switched portion of a cable network;
    inserting, into the routing message, a description of at least one Radio Frequency (RF) channel of a plurality of RF channels extending from a physical layer device; and
    transmitting the routing message to an adjacent intermediary device, wherein the routing message is not addressed to a gateway for the cable network but the RF channel description is propagated to the cable network gateway according to the routing protocol;
    wherein the RF channel description is communicated over an in-band communication path extending over the packet switched network portion; wherein the operations further comprise:
    selecting a subset of the RF channels; and
    inserting descriptions of only the selected subset of RF channels into the routing message such that the non-selected RF channels are not revealed to the cable network gateway, said insertion to control which RF channels receive tunnel traffic from the cable network gateway.

6. The memory device of claim 5, wherein selection of the RF channels for establishing tunnels thereto is distributed between the physical layer device and the cable network gateway, the physical layer device initially selecting the subset of RF channels and the cable network gateway subsequently selecting which RF channels from the subset receive the tunnel traffic.

7. The memory device of claim 6, wherein the operations further comprise:
    generating a new routing message;
    inserting a different subset of RF channels descriptions into the newly generated routing message; and
    transmitting the newly generated routing message to cause tunnel traffic to be re-distributed over the RF channels.

8. The memory device of claim 5, wherein the operations further comprise:

generating a type 9, 10, or 11 Open Shortest Path First (OSPF) Link State Advertisement (LSA); and attaching an extension to the LSA, the extension containing a predefined bit value indicating that the LSA contains a description of a modulated channel.

9. The local gateway of claim 1, wherein the circuitry is further configured to attach an extension to the routing message, the attached extension containing a field value that is pre-shared with the remote gateway.

10. The local gateway of claim 9, wherein the field value is not pre-shared with the adjacent intermediary device.

11. The memory device of claim 5, wherein the operations further comprise attaching an extension to the routing message, the attached extension containing a field value to which the remote gateway is programmed to respond.

12. The memory device of claim 5, wherein the field value is one for which the adjacent intermediary device is not programmed to respond.

* * * * *